United States Patent [19]
Kure-Jensen et al.

[11] 4,446,377
[45] May 1, 1984

[54] LOW COLLAPSE SPEED LUBE OIL PUMPING SYSTEM FOR TURBOMACHINERY

[75] Inventors: Jens Kure-Jensen; Robert A. Marshall, both of Schenectady, N.Y.

[73] Assignee: General Electric Company, Schenectady, N.Y.

[21] Appl. No.: 374,416

[22] Filed: May 3, 1982

[51] Int. Cl.³ .......................... F01D 25/20; F02C 7/06
[52] U.S. Cl. ...................................... 290/52; 60/39.08; 415/175
[58] Field of Search ................. 290/40 A, 40 E, 40 F, 290/52; 60/39.08, DIG. 3; 415/175

[56] References Cited
U.S. PATENT DOCUMENTS

| | | | |
|---|---|---|---|
| 2,124,395 | 7/1938 | Caughey | 415/175 |
| 2,440,980 | 5/1948 | Sheppard | |
| 2,671,860 | 3/1954 | Bevins | 60/39.08 |
| 3,626,693 | 12/1971 | Guillot | 60/39.08 |
| 3,699,351 | 10/1972 | Addie | 290/52 |
| 4,211,070 | 7/1980 | Portmann | 60/39.08 |
| 4,309,870 | 1/1982 | Guest et al. | 60/39.08 |

Primary Examiner—B. Dobeck
Assistant Examiner—Shelley Wade
Attorney, Agent, or Firm—Robert C. Kain, Jr.; John F. Ahern

[57] ABSTRACT

A low collapse speed, self priming, lubricating oil pumping system for a turbomachine, operatively driven by the turbine main shaft, is disclosed. In a preferred form, the invention includes a permanent magnet generator operatively coupled to shaft of the turbine-generator or turbomachine being lubricated and driven thereby to produce an electrical output; an induction motor directly connected to the electrical output of the permanent magnet generator without intervening protective devices such as fuses, switches, and so forth; and a positive displacement pump located in or in proximity to an oil reservoir and driven by the induction motor to pump oil from the reservoir at a flow rate and pressure sufficient to supply oil to the turbine-generator or turbomachine during all operating phases thereof during which lubrication is required.

16 Claims, 2 Drawing Figures

LOW COLLAPSE SPEED LUBE OIL PUMPING SYSTEM FOR TURBOMACHINERY

The present invention relates generally to lubricating oil systems for turbomachinery and in particular to a lubricating oil pumping system, powered by the turbomachine being lubricated, which maintains sufficient oil flow to ensure lubrication of the turbomachine bearings even at very low, nearly standstill turbine speeds. The system provides high reliability without dependence on backup oil pumping systems, backup power sources, and other protective means.

BACKGROUND OF THE INVENTION

The bearings of turbo-driven machinery such as, for example, large turbine-generators, are designed to operate with a continuous flow of lubricating oil so that the load of the shaft of rotor is borne by a hydrodynamic oil film formed between the shaft and the bearing surface. Large quantities of oil are required to pass through the bearings for this purpose and for the additional purpose of carrying away excess heat to prevent the bearings from overheating.

The conventional method of supplying lubricating oil to these machines is to provide an oil reservoir and a primary pumping system, powered by the rotating shaft of the turbine, to continuously pump oil from the reservoir to the bearings. As exemplified by U.S. Pat. No. 2,440,980 to Sheppard, these pumping systems utilize centrifugal pumps, the main one of which is coupled mechanically to the turbine shaft. The delivery pressure of these systems (i.e., of the centrifugal pumps) varies essentially with the square of the shaft speed, so that, during turbine shutdown, when the rotor is coasting down in speed, a point will be reached at which oil can no longer be delivered from the oil tank to the bearings. The system thus "collapses" during coast down. Typically, for a 3600 RPM machine the collapse speed may occur between 2000 and 2500 RPM. Similarly, during turbine startup, the pumping system will not prime itself since the oil reservoir is located below the turbine to permit gravity to be used to drain the bearings.

To make up for these shortcomings, motor driven auxiliary pumps are used to maintain the bearing oil flow at turbine speeds below the collapse speed and to prime the main centrifugal pump for startup. This dependence on auxiliary pumps requires a system of high reliability, however, to ensure that oil is pumped to the bearings during all operating phases of the turbine. In this regard, provision is made for backup emergency oil pumps which are powered by separate, direct current power sources and which are brought into action if the auxiliary pumps or their power sources fail. Overall, these systems are quite complex and despite great care in the provision of backup measures, failures still occur with some regularity.

With a failure of the lube oil pumping system resulting in loss of oil flow to the bearings, not only are the bearings themselves damaged but there is a potential for damage to the turbine rotor itself. Without lubrication, the journal bearing face metal (usually babbit metal) shortly becomes destroyed allowing the rotating shaft to sink somewhat into the supporting metal. This causes a loss of clearance around the rotor spill strips and so forth until the rotor ultimately begins to rub upon stationary parts. The damage can be very severe not only in terms of physical harm to the machine but also in economic terms because of lost power generating capacity.

In an earlier era, when turbomachines (such as turbine-generators) were smaller, mechanical drive oil delivery systems were used. These systems included a bevel or worm gear arrangement, driven by the turbine shaft, and a vertical shaft leading down to the oil tank where the shaft was coupled to a gear pump. Such systems became impractical with the advent of larger turbines, however. Also impractical with larger turbines, is the use of close-mounted oil tanks and self-priming positive displacement pumps driven by the turbine shaft. If the turbine is large, use of a close mounted tank makes it very difficult to rely on gravity to drain the more remote bearings. In addition, the large oil tank required for a larger turbine complicates installation close under the turbine.

An alternative system, somewhat widely used and satisfactory in combination with some smaller turbine-generators, provides ac motor driven positive displacement or centrifugal oil pumps for which the ac power is drawn from the main power generator. During startup and shutdown, however, this source of power is not operational and auxiliary power sources must be relied upon. Those problems described above therefore arise.

Accordingly, it is among the objects of the present invention to provide, for use with a turbomachine such as a turbine-generator, a lubricating oil pumping system which is powered by the turbine being lubricated and which is capable of maintaining a continuous flow of lubricating oil sufficient for bearing lubrication down to turbine speeds below which the turbine may be operated for short periods of time without bearing lubrication.

Generally, it is an object of the invention to provide a lubricating oil pumping system, for a turbomachine, which is operatively driven by the turbine main shaft, which has a very low pumping collapse speed, which is simple and straightforward, which is self priming, and which is able to provide bearing lubrication without reliance upon backup pumping systems.

SUMMARY OF THE INVENTION

These and other objects are attained by providing, in a preferred form of the invention, a lubricating oil pumping system including: (1) a permanent magnet generator operatively coupled to the shaft of the turbine-generator or turbomachine being lubricated and driven thereby to produce an electrical output; (2) an induction motor directly connected to the electrical output of the permanent magnet generator without intervening protective devices such as fuses, switches, and so forth; and (3) a positive displacement pump located in or in proximity to an oil reservoir and driven by the induction motor to pump oil from the reservoir at a flow rate and pressure sufficient to supply oil to the turbine-generator or turbomachine during all operating phases thereof during which lubrication is required. Operatively, the permanent magnet generator provides output power whose frequency is determined by the angular velocity of the rotating shaft. In turn, the induction motor and the positive displacement pump are driven at a speed porportional to the frequency of the power signal from the permanent magnet generator. The delivery rate of the positive displacement pump is porportional to speed, and, as the induction motor follows the frequency of the permanent magnet generator, the oil delivery rate is porportional to the turbine shaft speed. The oil flow requirements of the bearings are an exponential function of speed so that, as the system provides adequate oil at normal rated turbine speed, more than adequate flow is available at reduced speeds. Oil is delivered to the bearings during startup from nearly standstill to rated speed and during coast down to nearly standstill without auxiliary power sources and pumps even at a very considerable difference in elevation between the oil tank and the turbine.

By providing direct connections between the permanent magnet generator and the induction motor without intervening switches, circuit breakers, etc., a coupling is established between the permanent magnet generator and motor which is analogous to a very firm and reliable mechanical coupling. The permanent magnet generator is preferably able to sustain a short circuit on its output for an extended period of time without damage, and most preferably is of the type disclosed and claimed in U.S. patent application Ser. No. 315,333 filed Oct. 26, 1981 and issued as U.S. Pat. No. 4,417,168, which is assigned to the assignee of the present invention, the disclosure of which is hereby incorporated herein by reference.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
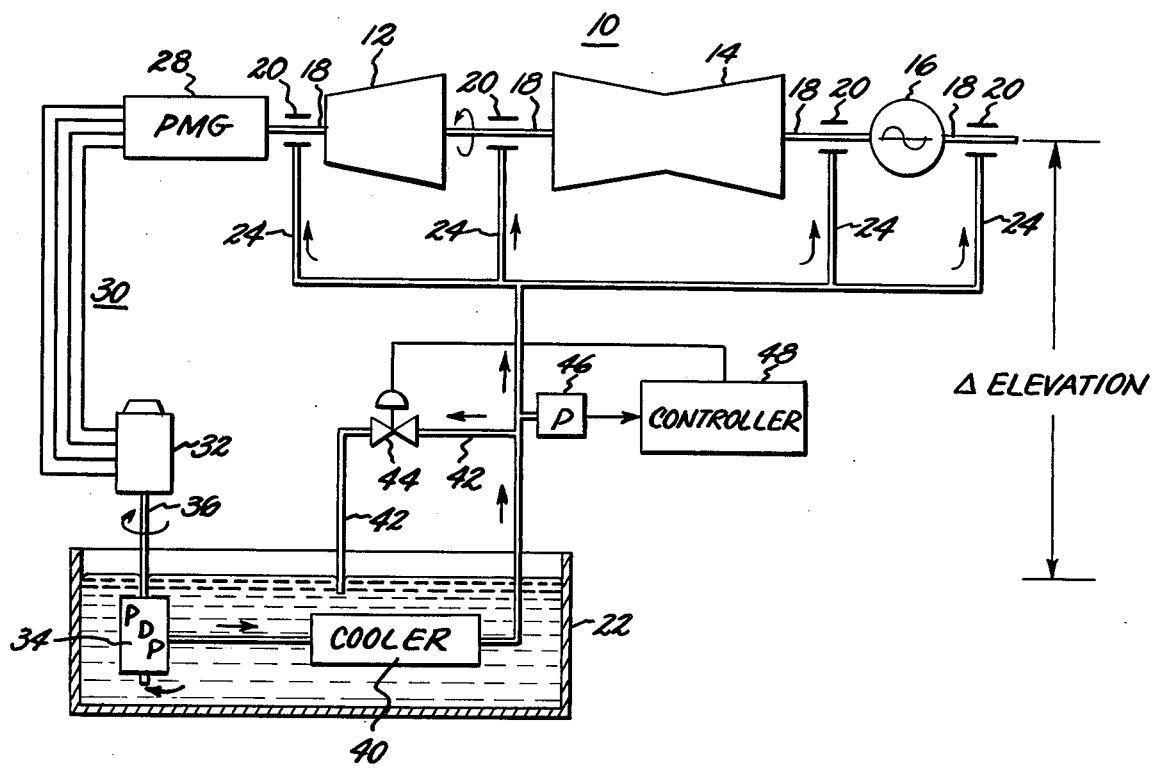
FIG. 1 is a schematic illustration of the invention as used with a large steam turbine-generator.

FIG. 1 illustrates an embodiment of the invention in combination with a large steam turbine-generator 10. Turbine generator 10, schematically illustrated in greatly simplified form to facilitate an understanding of the invention, includes a high pressure section 12, a low pressure section 14, and an electrical generator 16, all tandemly coupled together through shaft 18. In a well known manner, high energy steam is admitted to the turbine sections 12 and 14 as motive fluid for imparting rotational energy to shaft 18. The rotational energy is converted to electrical energy by generator 16 which supplies electrical power to a load, not illustrated. Shaft 18, carrying the central rotating elements of turbine-generator 10, is supported by journal bearings 20 located as appropriate along the length of shaft 18. The bearings, being well known components of a turbine-generator, are schematically illustrated. Further, although the bearings may differ in design and construction depending on the size of the turbine-generator and so forth, these details are not material to an understanding of the principles and operation of the present invention. It will be understood, for example, that thrust bearings as well as journal bearings may be used to advantage with the invention. Generally, the bearings 20 of the turbine-generator 10 may be considered to be of the flood lubricated type requiring a continuous flow of oil during turbine operation. Thus, the present invention, in the embodiment illustrated, is directed to the lubricating oil supply system for turbine-generator 10.

The lubricating oil system of FIG. 1 includes an oil tank or reservoir 22 from which oil is distributed to the bearings of the turbine-generator 10 through a piping system 24. Arrowed lines indicate the direction of oil flow from the reservoir 22 to the bearings. There is a difference in elevation between the turbine-generator 10 and the oil tank 22 so that oil is caused to flow from the bearings back to the reservoir 22 by gravity. For simplicity the oil return lines are not shown in FIG. 1.

The lubricating oil pumping system is powered by energy of the rotating shaft 18 and ultimately therefore by the steam which drives turbine-generator 10. Coupled to one end of shaft 18 is a permanent magnet generator (PMG) 28 arranged to be driven by shaft 18 so that an electrical output is generated whenever the shaft 18 is rotating. Although illustrated as coupled to the turbine end of shaft 18, it may be preferable in some turbine-generator installations to locate the PMG 28 at the generator end of the machine. Regardless of location, the PMG 28 requires no external excitation since the magnetic field is supplied by internal permanent magnets. Preferably, the electrical output of the permanent magnet generator 28 is in the form of three electrical phases. In any case, the output power of PMG 28 is at a frequency directly porportional to the speed of the rotating shaft 18. The electrical output of the PMG 28 is directly connected by a four conductor bus system 30 to an induction motor 32 located remotely from the PMG 28 and in proximity to the oil reservoir 22. It is notable that interconnection of the PMG 28 and the induction motor 32 is very direct with integral, single conductors used for each phase of the PMG output. Protective devices and switches are preferably not used in the interconnections between the PMG 28 and the induction motor 32. This has the effect of increasing the reliability of the interconnections between PMG 28 and induction motor 32 since potential failure sources are excluded. The PMG 28 is of such design that it can sustain a long term short circuit on its output without permanent damage. A preferred permanent magnet generator is that disclosed in the aforementioned Patent Application Ser. No. 315,333 now U.S. Pat. No. 4,417,168.

Induction motors are a well known variety of electrical motor, and induction motor 32 being of this general class (e.g., a squirrel cage motor) is chosen with sufficient power capacity and number of electrical poles to meet the needs of the lube oil pumping system. That is, the size of motor 32 and its running speed are determined by the size of the turbine-generator 10 and its lube oil requirements. The speed of the induction motor 32 is directly related to the number of electrical poles in the motor and to the frequency of the voltage and current supplied by the permanent magnet generator 28. The number of poles is fixed with the motor design. Thus, as the frequency of the power signal generated by PMG 28 depends on the running speed of turbine-generator 10 so does the operating speed of the induction motor 32. As a practical matter there is a slight slippage between the frequency of the PMG output and the speed of motor 32, but they are, nevertheless, directly related. The speed of motor 32 may be ratioed from the speed of the PMG 28 by selecting motor 32 with the appropriate number of poles in the well known manner.

A positive displacement pump 34, immersed in the oil tank 22, is coupled to the induction motor 32 through a drive shaft 36. Thus, the induction motor 32 serves as a prime mover for the oil pump 34. The positive displacement pump may be a gear pump, piston pump, or any of the other well known types of positive displacement pumps. As used herein, however, the term "positive displacement pump" intended to mean any of a variety of pumps capable of developing high discharge pressure even at low speeds, approaching zero speed. Preferably, pump 34 is a positive displacement pump of the type known in the art as a screw pump.

Oil drawn into the pump 34 from within the reservoir is pumped out through an oil cooler 40 and then into the distribution piping system 24. The delivery rate of pump 34 is porportional to speed, and, as the induction motor 32 follows the frequency of the PMG 28, the oil delivery rate to the bearings is porportional to the rotational speed of turbine shaft 18. During coast down of the turbine-generator 10, the combination of permanent magnet generator 28 and induction motor 32 operates as a variable speed drive system in which the decreasing frequency of the PMG output causes a reduction in induction motor shaft speed. Similarly, during startup, the permanent magnet generator frequency and induction motor shaft speed increase.

The pumping system of FIG. 1 including PMG 28, induction motor 32, and pump 34 may be sized to provide a particular rate of oil flow depending on the turbomachine requirements, the number of bearings, their design, and so forth. For universality, however, the system may also be selected for excess oil delivery capacity at normal operating speed for a given turbine and then provided with a bypass subsystem to return excess oil directly to the oil reservoir. For example, in FIG. 1 a bypass oil return line 42, including valve 44, is provided. This permits an oil pumping rate at normal turbine operating speed which is in excess of that required for lubrication purposes. Excess oil is returned directly to the tank 22 via bypass line 42 and valve 44. In effect, valve 44 can be adjusted to simulate one or more bearings in order to mate the pumping system to the turbine lubrication requirements Although valve 44 may be a manually adjusted valve to initially adjust the bypass flow and match the oil flow requirements to the lubrication needs of the turbine, an additional advantage may be gained by making valve 42 an automatic control valve whose opening is controlled by the pressure in the piping line 24. For such purpose, and as shown in FIG. 1, a pressure sensor 46 and a pressure controller 48 are provided. By these means a pressure is maintained in lines 24 over a wide turbine speed range extending up to the normal operating speed. Valve 44 is automatically adjusted to pass more or less oil as necessary to maintain the line oil pressure. As the turbine-generator 10, for example, runs at lower speeds, valve 44 tends toward the closed position to maintain the oil pressure in pipe lines 24. The principal advantage, however is that the pumping system can be sized to maintain lube oil flow down to turbine speeds approaching zero speed.

Figure 2:
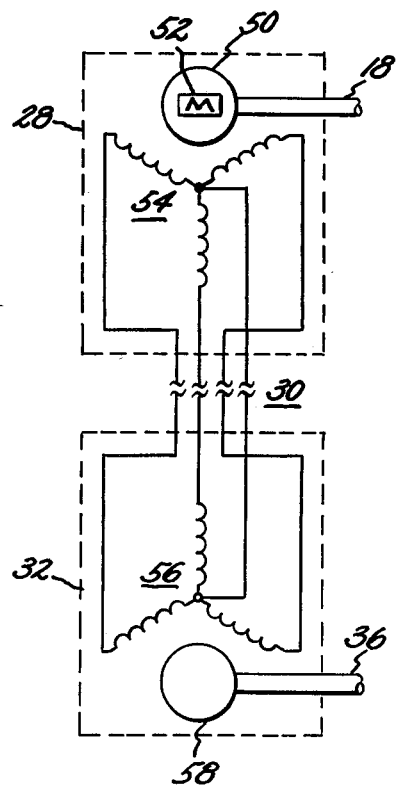
FIG. 2 is a schematic illustration of the electrical arrangement of the permanent magnet generator and induction motor of FIG. 1.

An electrical arrangement of PMG 28 and induction motor 32 of FIG. 1 is shown in greater detail in FIG. 2 wherein elements common to both Figures are identically designated. The turbine-generator shaft 18 is connected to drive the rotor 50 of PMG 28. Permanent magnets 52 mounted on the rotor for rotation therewith produce, through the resulting rotating magnetic field, a 3-phase voltage in the stator windings 54 of the PMG 28. The output power signal of the PMG 28 (i.e., voltage and current) is directly conveyed via condutors 30 to the induction motor 32. Induction motor 32 includes a 3-phase stator winding 56 and a squirrel cage rotor 58 which drives output shaft 36.

In tests of an embodiment of the invention, the flow of lubricating oil has been maintained down to equivalent turbine speeds on the order of 60 RPM at elevation heads up to 35 feet. This compares, for example, with collapse speeds of 2000–2500 RPM for conventional centrifugal pumping systems. At these low speeds (i.e., 60 RPM), it is feasible as an emergency measure to run the rotor of a large turbine-generator for a significant period of time (e.g., a matter of minutes) without oil being supplied to the bearings. This is generally sufficient time to take other appropriate corrective action. The aforementioned tests were carried out with a 7.5 KW, 60 Hz, 3-phase permanent magnet generator driven at a variable speed over the range of 0 to 3600 RPM. An induction motor directly coupled to drive a screw pump was used to deliver oil at heads up to 35 feet at flow rates of 50 gallons/min. The test scale was thus somewhat different from that required for a commercial scale turbine-generator, but was of sufficient magnitude to fully demonstrate the operability of the invention. Scale up, using a permanent magnet generator of the type disclosed in the above referenced patent application, is well within the skill of the art.

Thus, while there has been shown and described what is considered a preferred embodiment of the invention, it is understood that various other modifications may be made therein. It is intended to claim all such modifications which fall within the true spirit and scope of the present invention.

What is claimed is:

1. In combination with a turbomachine having a central rotor driven shaft, a lubricating oil system for supplying lubricating oil to the turbomachine, comprising:
   a lubricating oil reservoir;
   a permanent magnet generator operatively coupled to said shaft and driven thereby to produce an electrical power output having a frequency porportional to the rotary speed of said shaft;
   an induction motor connected to receive the electrical power output from said generator, said induction motor being driven thereby at a speed porportional to the frequency of said electrical power output; and
   a positive displacement pump operatively coupled to said induction motor and driven thereby to pump oil from said reservoir at a flow rate and pressure sufficient to supply oil to said turbomachine during all operating phases of said turbomachine during which continuous lubrication is required.

2. The combination of claim 1 wherein said induction motor is directly connected to said generator without intervening protective devices or switching means.

3. The combination of claims 1 or 2 further including an oil bypass line for bypassing lubricating oil in excess of that required for lubrication around the turbomachine directly to said reservoir, said bypass line having valving means for adjusting the flow rate of said excess oil.

4. The combination of claim 3 wherein said valving means is an automatic control valve and the combination further includes means sensing pressure of the oil being supplied to the turbomachine and a controller responsive to said means to automatically position said control valve for maintaining pressure of the oil being supplied to the turbomachine substantially constant over at least a portion of the turbomachine speed range.

5. The combination of claim 4 wherein said permanent magnet generator is a multiphase generator and said induction motor is a multiphase induction motor.

6. The combination of claim 5 wherein said positive displacement pump is immersed in said oil reservoir.

7. The combination of claim 6 wherein said positive displacement pump is a screw pump.

8. The combination of claim 7 further including an oil cooler disposed for cooling said oil pumped from said reservoir.

9. A low collapse speed lubricating oil pumping system for a turbine-generator comprising:
a lubricating oil reservoir;
a positive displacement pump having an inlet fluidly connected to the oil reservoir and an outlet fluidly connected to portions of the turbine-generator requiring lubricating oil for lubrication purposes;
an induction motor mechanically coupled to the positive displacement pump as a prime mover therefor;
a permanent magnet electrical generator mechanically coupled to the rotor of the turbine-generator and driven thereby to produce an electrical output signal whose frequency is porportional to the angular speed of the rotor; and wherein
said electrical power output signal is electrically connected to said induction motor to cause said motor and said pump to be operative at a speed proportional to the angular speed of the turbine-generator rotor so that a sufficient flow of oil for lubricating said turbine-generator is provided during all operative phases thereof during which continuous lubrication is required.

10. The lubricating oil pumping system of claim 9 wherein said permanent magnet generator and said induction motor are directly interconnected electrically without interposed protective apparatus or switching means.

11. The lubricating oil pumping system of claims 9 or 10 further including an oil bypass subsystem fluidly bypassing the turbine-generator so that at least a portion of any lubricating oil in excess of that required for turbine-generator lubrication is returned directly to the reservoir without passing through those portions of the turbine-generator requiring lubricating oil, said bypass subsystem having an adjustable valve for controlling the flow of said excess lubricating oil.

12. The lubricating oil pumping system of claim 11 wherein said adjustable valve is an automatic control valve and said subsystem further includes automatic control means responsive to the pressure of oil supplied by said positive displacement pump to automatically adjust said valve to maintain said pressure substantially constant.

13. The lubricating oil pumping system of claim 12 wherein said permanent magnet generator is a 3-phase generator and said induction motor is a 3-phase motor.

14. The lube oil pumping system of claim 13 wherein said positive displacement pump is a screw type positive displacement pump.

15. The lubricating oil pumping system of claim 14 wherein said positive displacement pump is immersed in said oil reservoir.

16. The lubricating oil pumping system of claim 15 further including an oil cooler fluidly connected at the outlet of said positive displacement pump for cooling oil flowing from said pump to the turbine.

* * * * *